June 11, 1929.  W. J. STILL  1,716,743

HEAT TRANSMITTING TUBE

Original Filed Nov. 17, 1926

Inventor
William Joseph Still
By B. Singer, atty.

Patented June 11, 1929.

1,716,743

UNITED STATES PATENT OFFICE.

WILLIAM JOSEPH STILL, OF LONDON, ENGLAND.

HEAT-TRANSMITTING TUBE.

Original application filed November 17, 1926, Serial No. 148,988, and in Great Britain November 21, 1925. Divided and this application filed April 23, 1928. Serial No. 272,297.

This application is a division of my copending application filed November 17, 1926, and bearing Serial Number 148,988.

This invention relates to that class of heat transmitting elements which are composed of a tube, upon which wire spirals are wound, such spirals being in some cases secured to the tube by soldering or the like, and by a binding wire passed through the spiral.

It has been established that a great increase in the rate of heat transmission between fluids of different temperature within and without a tube is effected if the velocities of flow over the surfaces are increased.

For example assume a tube containing hot water over which air at a lower temperature is passed, the rate of heat transmission from the water to the air will increase if the velocity of the air over the tube surface is increased, or conversely consider a tube containing cold water and hot gases are passed over the surface of the tube, the heat will be transmitted to the water at a higher rate if the velocity of the hot gases over the surface of the tube is increased. Moreover it has been established that the use of tubes of small diameter is beneficial and that there is an appreciable increase in the heat transmission efficiency if the flow of air or gas is across tubes set in zig-zag fashion instead of through them. It thus follows that heat flow is not constant for a given air flow but that the disposition of the surfaces may alter it materially.

The real problem is to provide means by which the fluid passing over the tube is constantly subdivided and caused to come into contact with fresh surfaces and the invention may be said to consist broadly of a heat transmission element consisting of a tube having radiating from it the parallel sides of a hollow ribbon of spiral wire secured thereon in heat conducting relation with the tube and so disposed as to divide the fluid— for instance, air—passing over it into thin streams so as to bring the particles into intimate contact with a heat conducting surface.

The specific form the invention takes in practice is a metal tube of suitable diameter having spirally wound upon it a ribbon of wire wound into the form of a hollow flat sided strip which is applied edgewise to the tube as will hereafter more clearly appear.

The commercial manufacture of the wire ribbon and the application of it to the tube in heat conducting relation involves the use of a specially designed machine as described in my specification of Serial No. 148,988.

The invention will be more clearly understood on reference to the accompanying drawings and detailed description.

Figures 1, 3:
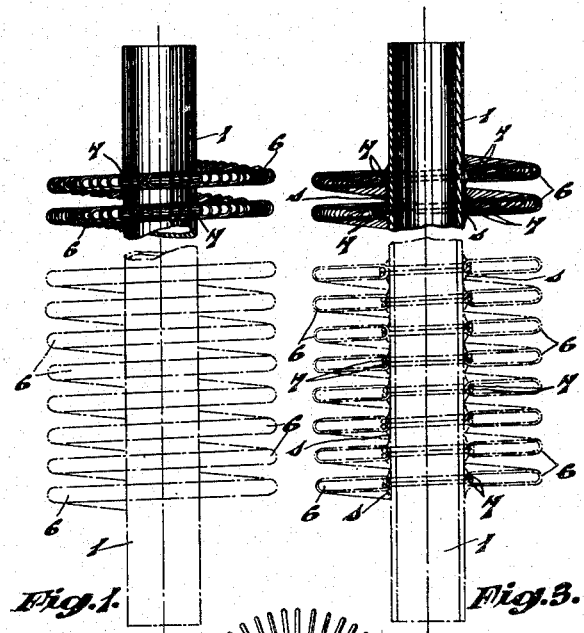
Figure 1 is an elevational full size view of a piece of a commercial tube element manufactured in accordance with and embodying the advantages of my invention.
Figure 3 is a view illustrating a section on the line 6—6 of Figure 2.
Figure 2:
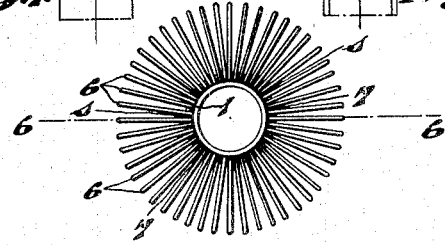
Figure 2 is an end view thereof.
Figure 4:
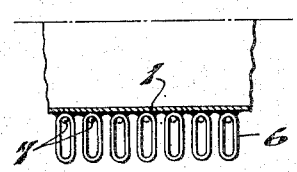
Figure 4 is a longitudinal section of a portion of the finished tube.
Figure 5:
Figure 5 is a side and an end elevation of a portion of the hollow flat-sided or ribbon coil.

It is not practical to cast or otherwise form a tube with a multiplicity of rods but precisely the same effect is obtained by constructing the tube element in the manner illustrated in Figs. 1 to 5 which will now be referred to. In these figures the tube 1 is an ordinary tube as before but the radiating elements are constituted by winding spirally on the tube a hollow ribbon 6 made of copper wire or other heat conducting material this ribbon being flat on its sides so as to be initially in the form of a ribbon and not a spiral wire tube of circular section which has been proved in the past to be inefficient. The preferred form of a piece of this ribbon is illustrated in Fig. 5. The hollow flat sided spiral 6 may be bound on the tube 1 by means of one or more binding wires 7 arranged within it, the free ends of each binding wire 7 being positively connected to the tube 1 by spot welding or otherwise. The soldering of the spiral 6 on the tube may be effected by winding a wire of solder upon the tube side by side with the spiral 6 and subjecting the tube to a temperature above the melting point of the solder. The edge of the spiral which abuts upon the surface of the tube may be milled prior to the winding operation, as shown at 6" Fig. 5.

What I claim and desire to secure by Letters Patent is:—

1. A heat transmitting element consisting of a tube having spirally wound thereon and secured edgewise a hollow ribbon of spirally wound wire.

2. A heat transmitting element comprising a tube, a hollow ribbon of spirally wound wire, the hollow ribbon being wound edgewise spirally round the tube and secured thereto at its contacting edge.

3. A heat transmitting element comprising a tube, a hollow ribbon of spirally wound wire, and a binding wire, the hollow ribbon being wound edgewise spirally round the tube and the binding wire arranged within the hollow ribbon and pressing and holding the inner narrow edge thereof in contact with the tube.

4. A heat transmitting element comprising a tube, and a hollow ribbon of spirally wound wire, the hollow ribbon being wound edgewise spirally round the tube and soldered thereto at its contacting edge.

5. A heat transmitting element comprising a tube, a hollow ribbon of spirally wound wire, and a binding wire, the hollow ribbon being wound edgewise spirally round the tube and the binding wire arranged within the hollow ribbon and pressing and holding the inner narrow edge thereof in contact with the tube the free ends of the binding wire being welded to the tube.

In witness whereof I affix my signature.

WILLIAM JOSEPH STILL.